United States Patent [19]

Richon et al.

[11] Patent Number: 4,855,262

[45] Date of Patent: Aug. 8, 1989

[54] METHOD OF MANUFACTURING SILICON NITRIDE COMPOSITION REINFORCED WITH SILICON CARBIDE WHISKERS HAVING SILICON OXIDE COATING

[75] Inventors: Dominique Richon, Ville La Grand, France; Olivier De Pous, Rome, Italy; Pierre Fontaine, Geneva, Switzerland

[73] Assignee: Battelle Memorial Institute, Geneva, Switzerland

[21] Appl. No.: 180,449

[22] Filed: Feb. 12, 1988

Related U.S. Application Data

[62] Division of Ser. No. 124,597, Nov. 24, 1987, abandoned.

[30] Foreign Application Priority Data

Nov. 25, 1986 [EP] European Pat. Off. ........ 86810540.4

[51] Int. Cl.⁴ .............................................. C04B 35/56
[52] U.S. Cl. ........................................ 501/92; 501/88; 501/95; 501/97; 428/367; 428/378
[58] Field of Search ................. 501/92, 95, 97, 88; 428/375, 367, 378

[56] References Cited

U.S. PATENT DOCUMENTS

| | | |
|---|---|---|
| 3,833,389 | 9/1974 | Komeya et al. ............... 501/98 X |
| 4,134,759 | 1/1979 | Yajima et al. ..................... 75/204 |
| 4,373,006 | 2/1983 | Galasso et al. .................. 428/368 |
| 4,481,179 | 11/1984 | Wei ................................. 423/346 |
| 4,543,345 | 9/1985 | Wei ................................. 501/95 |

FOREIGN PATENT DOCUMENTS

| | | |
|---|---|---|
| 0188270 | 7/1986 | European Pat. Off. . |
| 36-256985 | 11/1961 | Japan . |
| 58-95648 | 6/1983 | Japan . |
| 59-30770 | 2/1984 | Japan . |
| 59-15227 | 8/1984 | Japan . |
| 59-137366 | 8/1984 | Japan . |
| 59-156972 | 9/1984 | Japan . |
| 60-200863 | 10/1985 | Japan ............................... 501/97 |
| 61-111968 | 5/1986 | Japan . |
| 61-141678 | 6/1986 | Japan . |

Primary Examiner—William R. Dixon, Jr.
Assistant Examiner—Karl Group
Attorney, Agent, or Firm—Cushman, Darby & Cushman

[57] ABSTRACT

Reinforcing $Si_3N_4$ ceramics with preoxidized SiC whiskers improves flexural strength and WEIBULL modulus over that of comparable bulk $Si_3N_4$ ceramics or $Si_3N_4$ ceramics reinforced with neat SiC whiskers. Hot isostatic pressing further improves the physical properties of said ceramics.

10 Claims, No Drawings

METHOD OF MANUFACTURING SILICON NITRIDE COMPOSITION REINFORCED WITH SILICON CARBIDE WHISKERS HAVING SILICON OXIDE COATING

This is a division of application Ser. No. 124,597, filed Nov. 24, 1987, abandoned.

The present invention concerns high-temperature high-strength ceramics and, more particularly, fiber reinforced sintered silicon nitride ceramics for the manufacture of mechanical parts subjected to high mechanical stress at elevated temperatures, e.g. the turbine blades of turbo-charged engines and jet engines.

It is known that difficulties are encountered in the use of ceramic materials for building machine parts such as gas turbine blades, bearings, and rollers used in internal combustion engines of various kinds. Such difficulties may arise from different causes one of which is the relative brittleness of the ceramic materials.

Failure may result from the presence, in the bulk of the ceramic, of microcracks and the presence of inhomogeneities due to extraneous impurities which are nearly impossible to avoid during manufacturing processes.

One extremely useful approach to decreasing brittleness, improving flexural strength and increasing resistance to mechanical and thermal shocks in sintered $Si_3N_4$ is to incorporate therein reinforcing ceramic fibers or whiskers. Thus in Japanese patent application No. 188.582/81 by ASAHI GLASS COMPANY, there is disclosed silicon nitride ceramics reinforced with 5 to 35% by weight of $Si_3N_4$ or SiC fibers having 5 to 20 $\mu$m diameter, about 20 mm in length and a tensile strength of about $2.10^9$ N/m$^2$ (200 kg/mm$^2$).

Such ceramics obtained by, successively, molding into shape mixtures of powdered $Si_3N_4$, reinforcing fibers and suitable heat decomposable binders and thereafter sintering the molded objects under nitridation conditions at 1100°-1450° C., have bending strength above 250 MPa (25 kg/mm$^2$).

Japanese patent application No. 202.074/1981 discloses the manufcturing by hot pressing of fiber-reinforced sintered silicon nitride articles from a molding composition containing $Si_3N_4$ powder and, by weight, 10-40% of silicon carbide fibers. This composition also contains sintering aids (5-20% by weight) selected from magnesium oxide, yttria and alumina and a binder. Bending strengths of up to 470 MPa (47 kg/mm$^2$) at 1300° C. have been reported for articles hot pressed at 1800° C. under 400 kg/cm$^2$ for 60 min.

Japanese patent application No. 140.833/1982 discloses composite ceramics made of silicon nitride reinforced with 5 to 50% by weight of SiC crystalline fibers 10-500 $\mu$m long and with a diameter of 0.1-10 $\mu$m. Such composite ceramics are made from from molding compositions containing $Si_3N_4$ powders of grain size 0.1-5 $\mu$m, the required amount of SiC fibers and 0.12% by weight of binders selected from solutions of polyvinyl alcohol, acrylic resins, cellulose and sodium alginate in $H_2O$, alcohol or other organic solvents, by drying the shaped articles below 600° C. and finally sintering at about 1600°-1850° C. under pressure or in an atmosphere of nitrogen at 1200°-1400° C.

Values of strengths at 1300° C. reported for the sintered articles are in the 480-550 MPa range (48-55 kg/mm$^2$) with relative densities of up to 100% of theory.

Although the above disclosed results are very interesting and promising, the present inventors desired to further improve the properties of SiC fiber (or whisker) reinforced $Si_3N_4$ ceramics, particularly regarding the bending strength at high temperature and the "WEIBULL modulus" parameter. It is reminded that this parameter (m) is a statistical expression defining the probability of failure in a predetermined range of flexural strength values. Hence, the starting parameter here is the measurement of the flexural strength values "$\sigma$" for a number "n" of identical ceramic probes.

Generally, $\sigma$ is measured on a rectangular prism of ceramic b mm wide and d mm thick horizontally resting on two vertical supporting edges distant from each other by a distance of a mm. A force W is applied vertically from above, and oriented symmetrically (i.e. centered) relative to the two supporting edges, by two points separated by a distance c smaller than a. Half the difference between a and c constitutes a factor l which intervenes in the formula below to provide $\sigma$. The force W (in Newton) is progressively increased until the sample breaks and, then, $\sigma = Wdl/4I$ where I is the moment of inertia, i.e $I = bd^3/12$; thus, after substitution:

$\sigma = 3Wl/bd^2$ (expressed in MPa, i.e. $10^6$ times the value measured in N/m$^2$).

In order to calculate "m" (the WEIBULL modulus), "n" samples are measured and the various values of $\sigma$ found are organized as a series of progressively increasing numbers and each is given a rank "$n_i$" which depends on its magnitude i.e. its location in the serie (thus, the lower $\sigma$ has rank $n_i = 1$, the next one has rank $n_i = 2$, and so on). Then a corresponding number of parameters "Pni" are calculated from the formula $pn_i = n_i/(n+1)$ and finally a plot is made of log[log(1/1-P)] (ordinate axis) against log $\sigma$ (abscissa axis). This plot provides a straight line the slope of which is the Weibul module (m), a figure of merit, i.e. greater this slope, better the properties of the ceramic, i.e. its reliability.

The present inventors were aiming at improving the reliability of SiC whiskers reinforced $Si_3N_4$ ceramics obtained by molding into shape compositions containing a $Si_3N_4$ powder with grains of preferably 0.7-0.8 $\mu$m mesh size, a surface area of preferably 6-7 m$^2$/g and an oxygen content of preferably 0.8-1.2% by weight; 2-15% by volume of SiC whiskers of an average length of preferably 30-50 $\mu$m and a densification sintering aid preferably selected from aluminia, magnesia or yttria or mixtures thereof. Preferably, the amount by weight of the sintering aid is 5-12%.

Now, to their surprise, the present inventors found that the desired improved properties for the ceramic were attained when the SiC whiskers, are oxidized or peroxidized prior to their incorporation into the sintering composition. Such oxidation or peroxidation results from heating the whiskers, preferably in air, for a period of time. Hence, the composition of the invention incorporating this novel feature is summarized in claim 1. The method for making such a composition as well as the method for using the novel composition in the manufacture of improved fiber reinforced $Si_3N_4$ ceramics also belong to the present invention and are summarized in claims 2 and 3.

The conditions to perform the key features of the invention, i.e. heat treating the SiC whiskers, preferably in air at about 1000° C. for a period of time are easily implemented.

For instance the fibres are placed in a MgO or $Al_2O_3$ crucible and the crucible is heated under air in an oven at a temperature around 1000° C. for a period sufficient to provide a thin layer of $SiO_2$ (2-20 nm) on the whiskers. This can be ascertained from the fact that the green color of the whiskers becomes lighter, the fibers tend to bind to each other (welding) and the edges thereof get smoothed and rounded. It is important that the reaction conditions are not too severe (i.e. temperatures too high or reaction times too long) otherwise the fibers may loose some of their desirable properties (inherent or acquired during the heat treatment). Conversely, the reaction conditions should be sufficient for the whiskers to acquire the desired properties brought about by the heat treatment according to the invention, otherwise the said improvements may not be sufficiently significant: for instance too low heating temperatures or too short reaction times may be insufficient to bring to the whiskers the desirable properties of this invention. Generally, the range of conditions expressed in the claims are adequate but one may prefer to carry out the heating between 950 and 1050° C. for 1 to 3 hours, preferably for 2 hours for optimal results.

The details pertaining to the carrying out of the method summarized in the claims are set forth below.

Generally the sintering aid, for instance MgO is premilled before being mixed with the $Si_3N_4$. Premilling is effected in a plastic ball mill with an organic solvent for a time sufficient to obtain a grain size of about 5 to 100 nm. This operation is effected in air or under an inert gas such as nitrogen. Then the premilled sintering and densification aid and the $Si_3N_4$ powder are milled together preferably in a plastic jar containing $Si_3N_4$ balls of about 10 mm diameter and a mixing solvent such as a 1:3 by weight mixture of t.butanol and petroleum-ether, and rotating at about 80150 r.p.m. Thus the jar containing the above ingredients may be placed on two parallel rubber coated rolls and rotated there for a time sufficient to bring about full homogeneity. Generally 100–200 hours rotation are sufficient to obtain such results at room temperature. The milling ingredients may also contain, if desired, substantial quantities of a moulding binder which binders generally known from current practice can be used such as those mentioned in Japanese patent application No. 140.883/1982, in similar quantities by weight relative to the rest of the ingredients. Camphor can also be used as a binder.

After milling of the $Si_3N_4$ with the densification aids is terminated, incorporation of the heat-pretreated SiC whiskers is effected. For this a generally larger container, for instance, also a plastic jar, is used including a few $Si_3N_4$ balls and the same milling liquid (organic solvent). Since breaking of the whiskers during mixing should be avoided, the jar is rotated at a slower speed than before, e.g. 30–40 r.p.m. for about 10–40 hours is generally convenient. After homogeneously blending the preoxidized SiC whiskers with the $Si_3N_4$ powder, the mixture is granulated over a 300500 μm mesh sieve or screen in order to further homogenize the particle size in the composition.

Then the composition is dried from the volatile organic solvents under reduced pressure (10–30 Torr) and moderate heating (20°–40° C. under air or an inert gas such as argon or nitrogen). The dried powder which is free flowing is thereafter shaped into objects, for instance ceramic rectangular prismatic probes or mechanical parts, by conventional isostatic moulding in a flexible mould under 2–5000 bar for a few seconds to a few minutes.

The moulded object ("green") is then sintered under nitrogen at 1750°–1800° C. for about 5 to 30 min, whereby a ceramic with density ranging from about 3.05 to 3.14 (with up to 15% SiC heat-treated whiskers) is obtained.

In a variant of the above method, the sintered object can be further subjected to hot isostatic pressing (HIP) at 1650° C. under 2000 bar of nitrogen, whereby density increases of about 1–4% are experienced, with corresponding improvement to the ceramic properties.

The ceramics obtained as disclosed have a high-mechanical resistance and reliability at temperatures in the range 1200°–1400° C. The heat treated SiC fibers with a film of $SiO_2$ decrease brittleness and enhance the high temperature resistance of sintered $Si_3N_4$ without decreasing tenacity. Also the WEIBULL modulus is improved.

The following Examples illustrate the invention.

EXAMPLE 1

In a 1 liter plastic jar were introduced 300 g of silicon nitride powder (Starck, Germany Crade H,) of which the grains had an average diameter of 0.7–0.8 μm, a surface density of 6–7 $m^2/g$ and an oxygen content of 1.1% by weight. Then 30 g of MgO premilled to a 0.1 μm average grain size (premilling: 150 g MgO+500 ml alcohol +500 g $Si_3N_4$ balls, 72 hours/100 r.p.m.) were also placed in the flask together with 1 kg of 10 mm diameter $Si_3N_4$ balls and 500 ml of a 1:3 (by weight) mixture of tert-butanol petroleum ether.

The jar was rotated at 100 r.p.m. for 144 hours on a rotating set comprising two parallel rubber coated rolls rotating horizontally at a distance of 3 cm from each other.

The slurry was filtered over a 50 μm screen and it was poured into a 2 liter plastic flask over 1 kg of $Si_3N_4$ balls (5 mm size), 1 liter of the same organic dispersing solvent and a quantity of SiC whiskers ranging from 4 to 15% by volume (of the $Si_3N_4$). The whiskers with diameter of 0.5 microns and length from 30 to 50 microns, bought from Tokai Carbon, had first been heated for two hours in air at 1000° C. in an aluminia crucible in order to form a 5–6 nm $SiO_2$ layer on the surface.

The mixture was slowly rotated at 30 r.p.m. for 6 hours after which it was poured into a rotating evaporator flask and evaporated under rotation at 30° C./10 Torr until dry. The dry powder was then screened over a 500 μm mesh screen.

Then, a portion of the granulated composition was introduced into rubber moulds for isostatic pressing and shaped into green bars under 4000 bar of nitrogen for 30 sec.

The obtained greens were then sintered at 1750° C. under nitrogen for 15 min.

The samples, labelled 1 to 4, contained, respectively 4, 5, 10 and 14% by volume of the heat treated fibers. The densities ranged from 3.12 to 3.05, high proportion of fibers decreasing the density. Controls with no whiskers were also made. Testing of the probe bars is given in Example 4. Results of the four points bending strength are reported in table I hereafer.

EXAMPLE 2

The experiments of Example 1 were identically repeated but using compositions in which the SiC whiskers were not heat-treated. Thus, the samples of this example constitute controls; they were labelled, A,B,C and D and contained the same proportions of fibers than the samples of example 1, respectively (by volume) 4, 5, 10 and 14%. Control with no fiber is labelled 0.

EXAMPLE 3

Some of the samples of Example 1 were then subjected to Hot Isostatic Pressing (HIP) at 1650° C. under 2000 bar of nitrogen in a typical furnace designed for HIP processing. The corresponding samples were labelled 1H, 2H, 3H and 4H. The densities ranged from 3.14 to 3.18 (in g/cm$^3$). Control with no fiber was labelled OH.

EXAMPLE 4

(Testing of the samples from Examples 1 to 3 for flexural strength)

In a first series of measurements, the flexural strengths were determined as explained before at room temperature, 1200° C. and 1400° C. Table I below summaries the results in terms of MPa versus % by volume of SiC whiskers. The measured values are given for the three temperatures in succession:

TABLE I

| Sample | % whiskers | Flexural strength | | |
|---|---|---|---|---|
| No HIP | (heat treated) | room temp. | 1200° C. | 1400° C. |
| 0 | 0 | 510 | 410 | 280 |
| 1 | 4 | 470 | 560 | 380 |
| 2 | 5 | 465 | 580 | 540 |
| 3 | 10 | 360 | 190 | 130 |
| 4 | 14 | 320 | 310 | 110 |
| | % whiskers (untreated) | | | |
| 0 | 0 | 510 | 410 | 280 |
| A | 4 | 400 | 460 | 280 |
| B | 5 | 450 | 350 | 320 |
| C | 10 | 260 | 320 | 180 |
| D | 14 | 110 | 140 | 110 |
| HIP | % whiskers (heat treated) | | | |
| 0H | 0 | 530 | 390 | 380 |
| 1H | 4 | 640 | 520 | 420 |
| 2H | 5 | 630 | 660 | 400 |
| 3H | 10 | 500 | 380 | 360 |
| 4H | 14 | 380 | 490 | 150 |

The above results show that the heat-treated whiskers bring consistant improvement to the flexural strength of the ceramic over the on-treated whiskers, especially at 5% volume content. Hot isostatic pressing brings further improvement in the 5% range although less dramatic.

EXAMPLE 5:

Measurements of the WEIBULL module (m)

These measurements ($\sigma$) were done as disclosed hereinbefore at room temperature using a series of 30 probes in each category. The categories investigated were the pure Si$_3$N$_4$ after sintering (samples O, control), the matrix containing 5% of untreated fibers (B of Example 2), the ceramics of Example 1 with 5% heat-treated fibers (sample 2) and the same categories after hot isostatic pressing, respectively OH, BH and 2H (see Example 3).

The results of "m" calculated as explained previously are provided in Table II below.

TABLE II

| Sample category (30 Probes each) | m |
|---|---|
| (0) Si$_3$N$_4$, no fiber, sintered | 11 |
| (B) 5% SiC untreated, sintered | 8.45 |
| (2) 5% SiC heat-treated, sintered | 12.8 |
| (OH) Si$_3$N$_4$, no fiber, HIP | 9.89 |
| (BH) 5% SiC untreated, HIP | 12.02 |
| (2H) 5% heat-treated, HIP | 16.26 |

These results show that the samples containing 5% heat-treated SiC whiskers and subjected, afterwards, to hot isostatic pressing are definitely more reliable than other samples.

What is claimed:

1. A method for the preparation of a silicon nitride pulverulent composition comprising the steps of: Division Application of RICHON et al -- S.N. 124,597
   (i) oxidizing SiC whiskers by heat treatment;
   (ii) ball milling $\alpha$-Si$_3$N$_4$ powder with a sintering aid in the presence of a dispersing phase solvent carrier;
   (iii) admixing said SiC whiskers by slow rotation on rolls without balls so as not to break the fibers and using a high proportion of the dispersing phase; and
   (iv) evaporating the solvent under rotation and granulating the remaining solid.

2. The method of claim 1, wherein said heat treatment comprises heating said SiC whiskers in air at from 950°–1050° C. for 1 to 3 hours.

3. A method according to claim 1 for making a sintered silicon nitride article comprising the further steps of:
   (i) isostatically molding said granulated solid into a green body at a pressure of from 2000–4000 bar; and
   (ii) sintering said green body at from 1750°–1800° C. under nitrogen for a period of from 5 to 30 minutes.

4. The method of claim 1, wherein heat-pretreatment of the SiC whiskers includes heating 0.1–5 hrs in air at about 1000° C.

5. The method of claim 1, which comprises using, as a dispersing phase solvent carrier, a mixture of tert-.butanol and petroleum-ether.

6. The method of claim 1, which comprises using in step (ii) 5–12% by weight of the sintering aid.

7. The method of claim 1, which comprises effecting the granulation of step (iv) on a 500 $\mu$m grating.

8. The method of claim 1, wherein the ball-milling step (ii) is effected by using Si$_3$N$_4$ balls and rotating at about 80–150 rpm, while the admixing step (iii) is effected by rotating at 30–40 rpm for 1–6 hrs.

9. A method of preparing a silicon nitride pulverulent composition comprising the steps of:
   (i) heating SiC whiskers at a temperature of from 950°–1050° C. for a period of time sufficient to provide a thin layer of SiO$_2$ on said whiskers;
   (ii) ball milling $\alpha$-Si$_3$N$_4$ powder with a sintering aid in the presence of a dispersing phase solvent carrier;
   (iii) homogeneously blending said heat-treated whiskers with the $\alpha$-Si$_3$N$_4$ powder, sintering aid and solvent mixture under conditions which avoid breaking the whiskers; and
   (iv) drying and sizing the blend to form a powder.

10. The process of claim 3, comprising an additional stage consisting of:
   (3) Subjecting the sintered article to hot isostatic pressing (HIP) at 1650° C. under 2000 bar.

* * * * *

UNITED STATES PATENT AND TRADEMARK OFFICE
CERTIFICATE OF CORRECTION

PATENT NO.   : 4,855,262
DATED        : August 8, 1989
INVENTOR(S)  : RICHON ET AL It is certified that error appears in the above-identified patent and that said Letters Patent is hereby corrected as shown below:

Claim 1, lines 2-3, delete "Division Application of RICHON et al -- S.N. 124,597".

Signed and Sealed this

Eighteenth Day of September, 1990

Attest:

HARRY F. MANBECK, JR.

*Attesting Officer*       *Commissioner of Patents and Trademarks*